United States Patent
Hotei et al.

(10) Patent No.: US 8,118,460 B2
(45) Date of Patent: Feb. 21, 2012

(54) MOTORCYCLE HEADLAMP

(75) Inventors: Takashi Hotei, Saitama (JP); Satoshi Kogo, Saitama (JP); Hayato Ohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/881,300

(22) Filed: Sep. 14, 2010

(65) Prior Publication Data

US 2011/0063863 A1 Mar. 17, 2011

(30) Foreign Application Priority Data

Sep. 16, 2009 (JP) ................. 2009-214935

(51) Int. Cl.
*B62J 6/00* (2006.01)
*B60Q 1/00* (2006.01)
(52) U.S. Cl. ........ 362/475; 362/507; 362/517; 362/544; 362/511; 362/184
(58) Field of Classification Search .................. 362/475, 362/507, 509, 517, 518, 520, 511, 543, 544, 362/184
See application file for complete search history.

(56) References Cited

U.S. PATENT DOCUMENTS

| 5,136,482 | A | * | 8/1992 | Urbschat | 362/517 |
| D575,426 | S | * | 8/2008 | Ohashi et al. | D26/28 |
| 2003/0123249 | A1 | * | 7/2003 | Iwamoto | 362/39 |
| 2007/0047249 | A1 | * | 3/2007 | Kogo et al. | 362/538 |
| 2008/0049438 | A1 | * | 2/2008 | Bloemen et al. | 362/540 |
| 2008/0175017 | A1 | * | 7/2008 | Terada et al. | 362/539 |

FOREIGN PATENT DOCUMENTS

| DE | 10 2004 040 160 A1 | 2/2006 |
| DE | 10 2005 008 634 A1 | 8/2006 |
| EP | 1 420 204 A2 | 5/2004 |
| JP | 2003 338210 A | 11/2003 |
| JP | 2006 134700 A | 5/2006 |
| JP | 2008084595 A | 4/2008 |

OTHER PUBLICATIONS

European Search Report application No. 10171599.3 dated Nov. 17, 2010.

* cited by examiner

*Primary Examiner* — Ali Alavi
(74) *Attorney, Agent, or Firm* — Squire Sanders (US) LLP (57) ABSTRACT

A lens includes extended lens portions extending leftward and rightward beyond a high beam reflecting portion, respectively. The lens forms an X shape when viewed from the front, due to the extended lens portions. Paired left and right light guide members are disposed below a reference axis of a low beam bulb on lateral sides of a high beam bulb, respectively. Extension members are disposed along side edges of the lens in such a manner as to cover front sides of the light guide members, respectively. Opening portions are formed in the extension members so as to guide light from the light guide members to the extended lens portions respectively. Light from the low beam bulb is emitted to an outside through the light guide members, the opening portions, and the extended lens portions.

17 Claims, 9 Drawing Sheets

MOTORCYCLE HEADLAMP

BACKGROUND

1. Field

Embodiments of the present invention relate to improvements in a motorcycle headlamp.

2. Description of the Related Art

Conventional motorcycle headlamps include a headlamp in which an extension is provided in such a manner to cover the front end of a reflector (see Japanese Patent Application Publication No. 2008-84595, for example).

According to Japanese Patent Application Publication No. 2008-84595, an extension is disposed in front of the front end edge of a reflector constituting a headlight.

The extension is formed of an opaque member and a light transmissive member. Light reflected by a parabolic dedicated reflection surface provided on an outer side of the reflector is transmitted through the light transmissive member of the extension. In this way, the extension appears as illuminated or shining.

According to the above technique, when the extension emits light, for example, in an annular shape, the visibility and the appearance of the headlight is improved. However, the technique employs a structure in which the extension emits light by applying reflected light from the parabolic dedicated reflection surface to the extension. Hence, the extension cannot emit light if the extension is disposed, for example, at a position which the reflected light cannot reach. This leads to a restriction on the design freedom of the headlight. Also, it is difficult to form the extension such that its light emitting part would have, for example, a laterally expanded appearance. Specifically, in a case of a left-right two-lamp headlight, the headlight may be stretched laterally. In contrast, in a case of a top-bottom two-lamp headlight, lateral expansion of a light beam and/or an original characteristic design are/is desired. For this reason, it is desirable to devise top-bottom two-lamp headlights.

SUMMARY

An object of the present invention is to provide a motorcycle headlamp whose visibility and appearance can be improved. According to one embodiment this object and others are achieved by using light emitting parts having laterally expanded appearances, and which also emphasize its characteristic and pleasing design, with less restriction on the design freedom, without having to use a separate light source such as a position lamp or an LED.

One embodiment of the invention is a motorcycle headlamp including a housing, and a reflector disposed inside the housing. The reflector is divided into top and bottom reflectors disposed in an approximately center portion, in a vehicle width direction, of a vehicle body. The headlamp may further include a first bulb and a second bulb attached to the top and bottom reflectors into which the reflector is divided. The first bulb is attached to the top reflector, the second bulb is attached to the bottom reflector, and a lens is disposed in front of the reflector. The lens includes extended lens portions extending leftward and rightward beyond the bottom reflector, respectively, and is formed in an X shape when viewed from a front view due to the extended lens portions. Paired left and right light guide members are disposed below a reference axis of the first bulb on lateral sides of the second bulb, respectively. Extension members are disposed along the extended lens portions in such a manner as to cover front sides of the light guide members, respectively. Opening portions are formed in the extension members so as to guide light from the light guide members to the extended lens portions, respectively. Light from the first bulb is emitted to the outside through the light guide members, the opening portions, and the extended lens portions.

In another embodiment, the first bulb is a low beam bulb, and the second bulb is a high beam bulb.

According to another embodiment, the light guide members and the extension members are disposed at such positions as not to block reflected light reflected in a vehicle front direction by a first reflecting portion and a second reflecting portion which are formed in the reflector, and which are dedicated for the first bulb and the second bulb, respectively.

In another embodiment, the light guide members are screwed to back portions of the extension members, respectively.

According to one embodiment, the light guide members are disposed as a left and right pair in a truncated reverse V shape in front view.

In another embodiment, the opening portions are formed as a left and right pair in a truncated reverse V shape in front view.

According to another embodiment of the invention, the light guide members are colored.

In another embodiment, a front fork is steerably provided to support a front wheel, and is disposed behind the housing. Convex portions to prevent interference with the front fork are formed in a back portion of the housing.

Another embodiment includes a method. The method includes providing a housing, providing a reflector disposed inside the housing, and dividing the reflector into top and bottom reflectors disposed in an approximately center portion, in a vehicle width direction, of a vehicle body. The method also includes attaching a first bulb and a second bulb to the top and bottom reflectors into which the reflector is divided. The first bulb is attached to the top reflector, and the second bulb is attached to the bottom reflector. The method also includes disposing a lens in front of the reflector. The lens includes extended lens portions extending leftward and rightward beyond the bottom reflector, respectively, such that the lens portions form an X shape. The method further includes disposing paired left and right light guide members below a reference axis of the first bulb on lateral sides of the second bulb, respectively, disposing extension members along the extended lens portions in such a manner as to cover front sides of the light guide members, respectively, and forming opening portions in the extension members so as to guide light from the light guide members to the extended lens portions, respectively. Light from the first bulb is externally emitted through the light guide members, the opening portions, and the extended lens portions.

DETAILED DESCRIPTION

Examples for carrying out the present invention will be described based on the accompanying drawings. Note that throughout the description, left, right, front, and rear denote directions based on the viewpoint of the driver on a vehicle. Also, the drawings should be viewed in the direction in which reference numerals are read.

Embodiments of the present invention will be described below. Arrows (FRONT) in drawings indicate a vehicle front direction.

Figure 1:
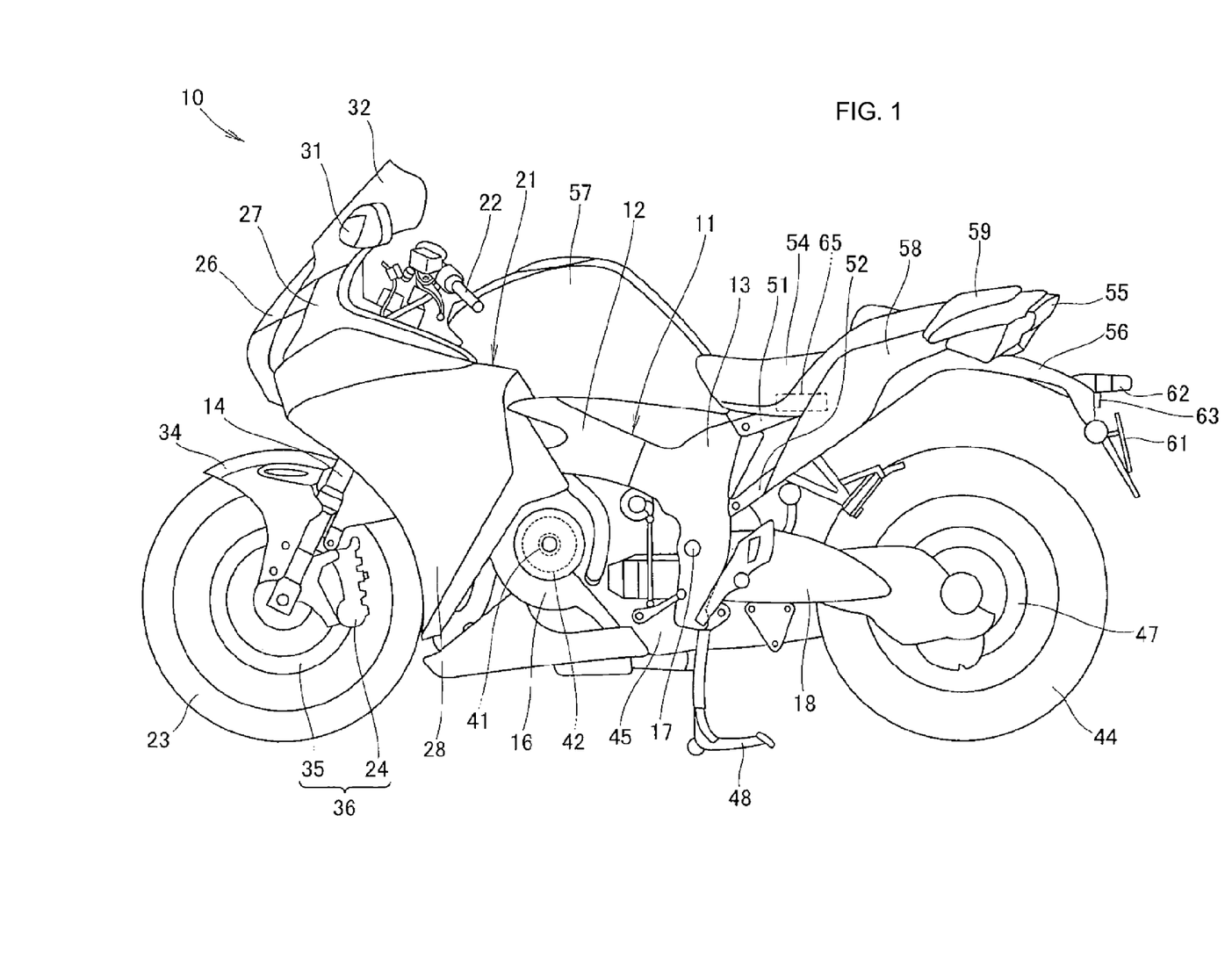
FIG. 1 is a side view of a motorcycle including a headlamp according to an embodiment of the present invention.

A motorcycle 10, according to one embodiment, is a vehicle structured as shown in FIG. 1. Specifically, a vehicle body frame 11 as a framework is mainly formed of paired left and right main frames 12, 12 (only reference numeral 12 on the near side is shown) and paired left and right pivot plates 13, 13 (only reference numeral 13 on the near side is shown) joined to rear end portions of the main frames 12, 12, respectively. Front end portions of the main frames 12, 12 support a front fork 14 steerably. The main frames 12, 12 and the pivot plates 13, 13 support an engine 16 integrated with a transmission. The pivot plates 13, 13 support a swing arm 18 vertically swingably about a pivot shaft 17.

The front side and both lateral sides of an upper portion of the front fork 14 may be covered with a cowling 21. A bar handle 22 is attached to an upper end portion of the front fork 14. A front wheel 23 and a break caliper 24 are attached to a lower end portion of the front fork 14.

The cowling 21 may include a front cowl 27 to which a headlamp 26 is attached, and paired left and right side cowls 28, 28 (only reference numeral 28 on the near side is shown) expanding rearward and downward from lateral sides of the front cowl 27, respectively. Here, reference numerals 31, 31 (only reference numeral 31 on the near side is shown) denote paired left and right front turn signal lamps attached to the front cowl 27. Reference signal 32 denotes a windscreen extending obliquely upward and rearward from an upper portion of the front cowl 27.

The front wheel 23 is covered with a front fender 34 whose upper portion is attached to the front fork 14.

Together with a break disk 35 integrally attached to the front wheel 23, the brake caliper 24 constitutes a front disk break 36.

The engine 16 includes, inside its crankcase, a crankshaft 41 extending in a vehicle width direction, and an AC generator 42 having a rotor attached to one end of the crankshaft 41 and a stator attached to the other end.

A front end portion of the swing arm 18 is attached to the pivot shaft 17, and a rear wheel 44 is attached to a rear end portion of the swing arm 18. The swing arm 18 accommodates therein a drive shaft 46 to transmit power to the rear wheel 44 from a transmission 45 provided to a rear portion of the engine 16. Here, reference numeral 47 denotes a break disk constituting a rear disk break. Reference numeral 48 denotes a main stand attached to a lower end portion of each pivot plate 13.

Paired left and right seat rails 51, 51 (only reference numeral 51 on the near side is shown) and paired left and right sub frames 52, 52 (only reference numeral 52 on the near side is shown) are attached to upper rear portions of the pivot plates 13, 13. Rear end portions of the seat rails 51, 51 are joined to rear end portions of the sub frames 52, 52, respectively.

A seat 54 and a rear combination lamp 55 disposed behind the seat 54 are attached to the seat rails 51, 51. A rear fender 56 to cover the rear wheel 44 from above is attached to the seat rails 51, 51 and the sub frames 52, 52.

Here, reference numeral 57 denotes a fuel tank attached to an upper portion of the vehicle body frame 11. Reference numerals 58, 58 (only reference numeral 58 on the near side is shown) denote paired left and right side covers covering portions under lateral portions of the seat 54. Reference numerals 59, 59 (only reference numeral 59 on the near side is shown) denote paired left and right grab rails which a passenger grabs while sitting on a rear portion of the seat 54. Reference numerals 61, 62, and 63 denote a license plate, a license plate lamp, and a reflex reflector, respectively.

A regulator 65 to control the output of the AC generator 42 is disposed between the left and right seat rails 51, 51 below the seat 54. The regulator 65 may be connected to an unillustrated battery.

Figure 2:
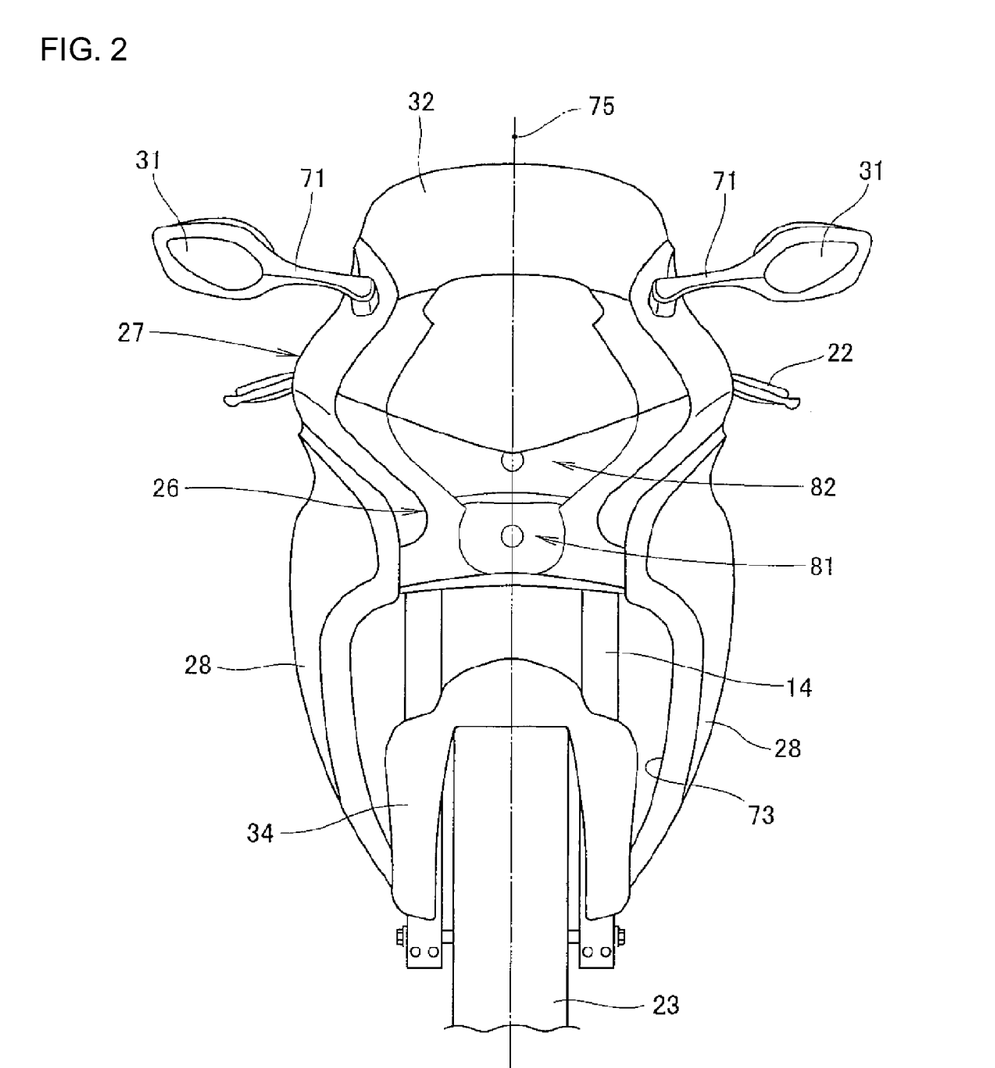
FIG. 2 is a front view of the motorcycle according to an embodiment of the present invention.

As shown in FIG. 2, the headlamp 26 having an X-shape is disposed in a lower center portion of the front cowl 27 between the left and right side cowls 28, 28.

The front turn signal lamps 31, 31 are attached to left and right sides of an upper portion of the front cowl 27 with turning signal supports 71, 71 extending rightward and leftward being interposed in between, respectively. Here, reference numeral 73 denotes an opening area defined by the left and right side cowls 28, 28 and the headlamp 26. The front fork 14 and the front fender 34 are partially disposed in the opening area 73.

Reference numeral 75 denotes a vehicle body center line extending vertically through the center, in the vehicle width direction, of the vehicle body of the motorcycle 10.

Figure 3:
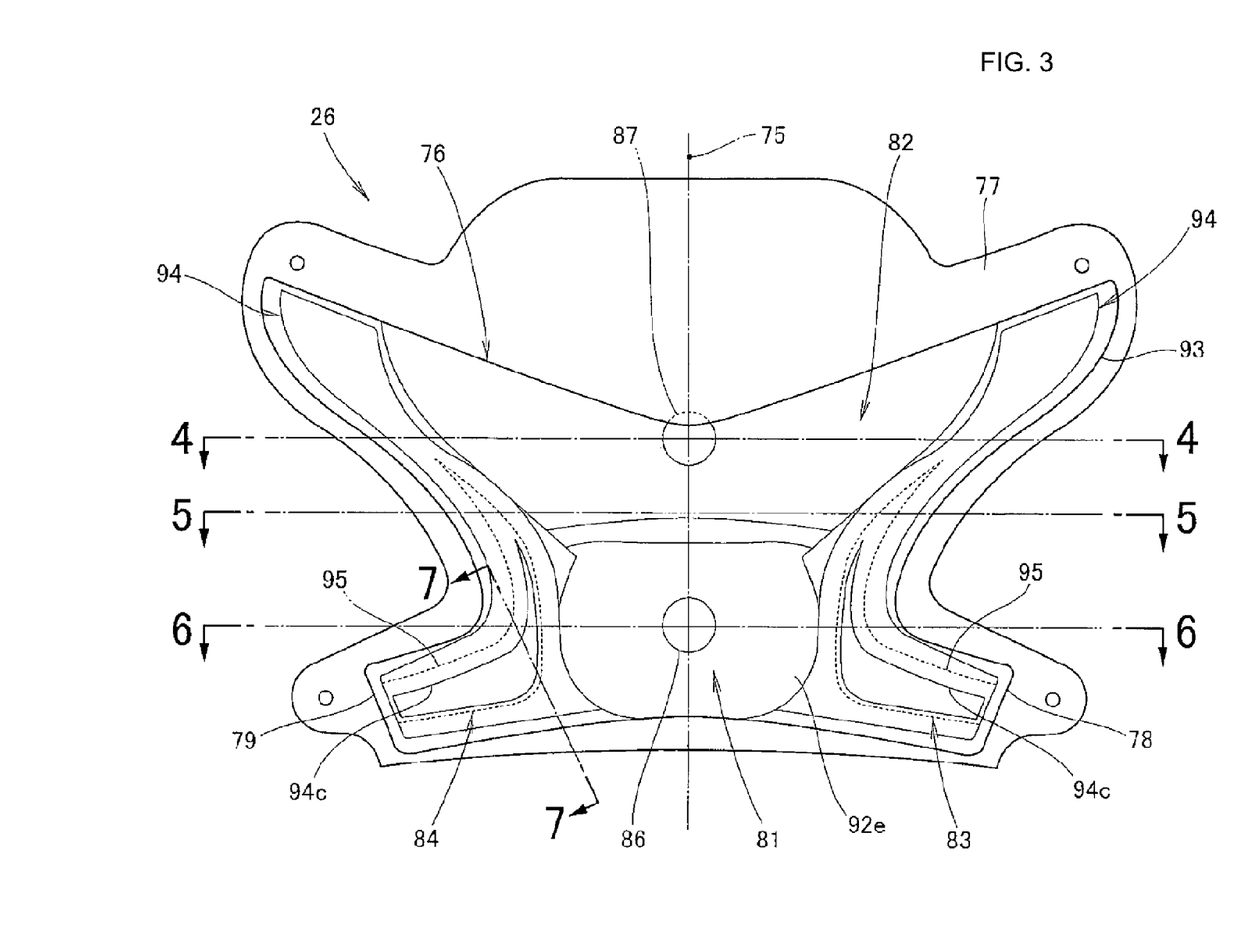
FIG. 3 is a front view of the headlamp according to an embodiment of the present invention.

As shown in FIG. 3, the headlamp 26 includes an effective irradiating part 76 that effectively illuminates an area ahead of the vehicle. Headlamp 26 may also include a lamp edge part 77 formed in the periphery of the effective irradiating part 76 and covered with peripheral parts.

The effective irradiating part 76 is formed in an X shape, and includes: a main beam lamp 81 (hereinafter, referred to as a "high beam lamp 81") that irradiates a distant area ahead of the vehicle; a dipped beam lamp 82 (hereinafter, described as a "low beam lamp 82") that irradiates a close area ahead of the vehicle so as to reduce glare for pedestrians ahead of the vehicle and drivers in oncoming vehicles; and side light emitting parts 83, 84 that emit light by light generated upon light emission of the low beam lamp 82.

A high beam bulb 86 provided to the high beam lamp 81, and a low beam bulb 87 provided to the low beam lamp 82, are disposed on the vehicle body center line 75. The low beam valve 87 and the high beam valve 86 are aligned in this order from top to bottom.

The side light emitting parts 83, 84 are disposed on both lateral sides of the high beam lamp 81, respectively, in a symmetrical manner relative to the vehicle body center line 75.

Figure 4:
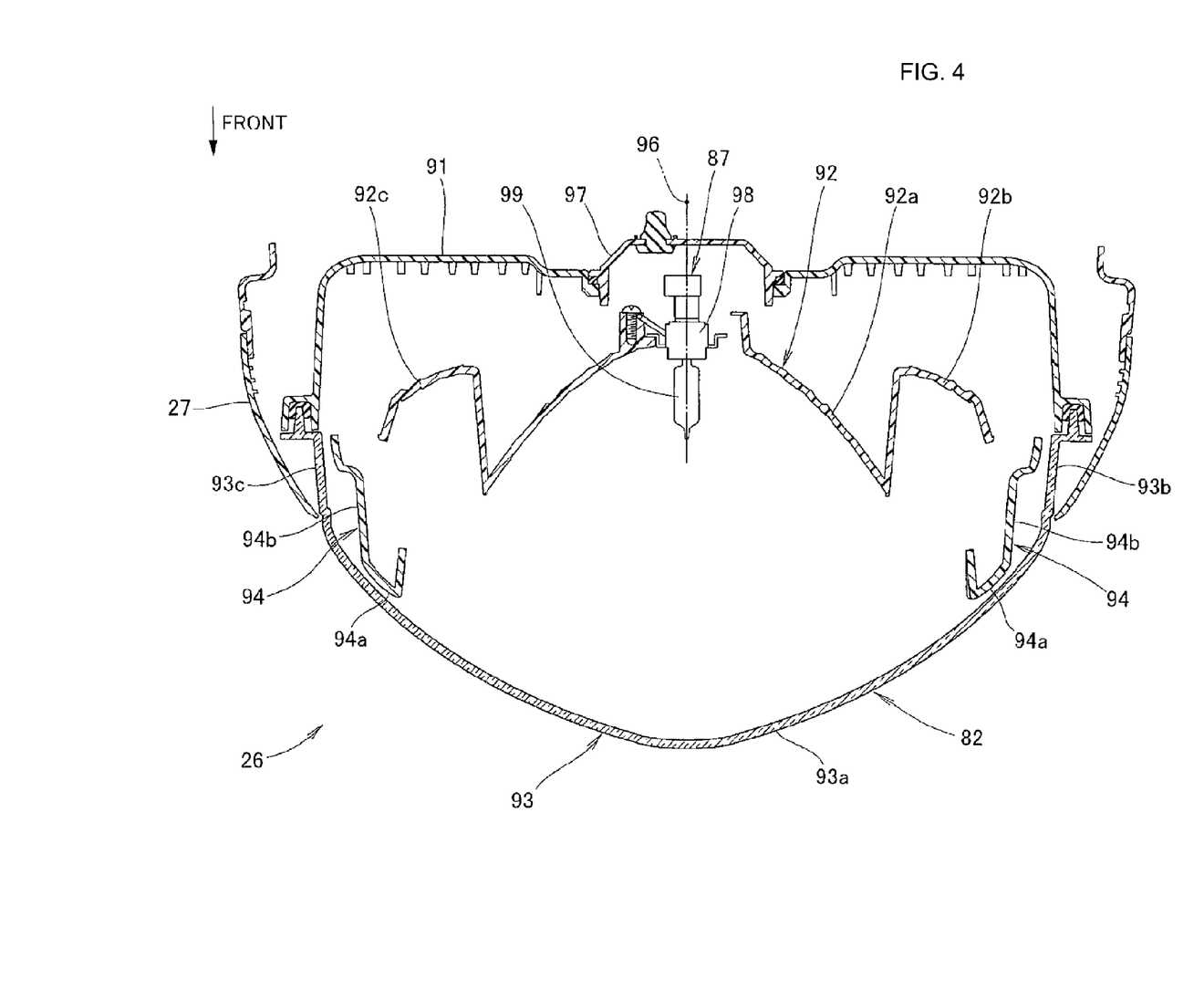
FIG. 4 is a cross-sectional view of the headlamp taken along the line 4-4 of FIG. 3.

As shown in FIG. 4, the headlamp 26 includes a housing 91, a reflector 92 attached to the housing 91, and the high beam bulb 86 (see FIG. 3) and the low beam bulb 87 attached to the reflector 92. Headlamp 26 may further include a lens 93 disposed in front of the reflector 92, the high beam bulb 86, and the low beam bulb 87, as well as also attached to a peripheral portion of the housing 91. Headlamp 26 can also include extension members 94, 94 disposed inward of left and right lateral portions of the lens 92, respectively, while being attached to an inner surface of the lens 92, and light guide members 95 (not illustrated, but described in detail below) disposed close to back sides of the extension members 94 94, respectively. Here, reference numeral 96 denotes a reference axis extending in a front-rear direction through the center of the low beam bulb 87. Reference numeral 97 denotes a maintenance cap detachably attached to the housing 91 for maintenance of the low beam bulb 87.

The low beam bulb 87 includes a base 98 attached to the reflector 92, a glass bulb 99 attached to the base 98, and a filament (unillustrated) disposed inside the glass bulb 99 and serving as a light source.

The reflector 92 includes a low beam reflecting portion 92a to reflect light from the low beam bulb 87, and lateral edge portions 92b, 92c provided on both lateral sides of the low beam reflecting portion 92a, respectively.

The lens 93 includes a main lens portion 93a curving frontward in a convex shape, and covered portions 93b, 93c provided on both lateral sides of the main lens portion 93a, respectively, and covered with the front cowl 27.

Each extension member 94 is disposed outward, in the vehicle width direction, of the low beam reflecting portion 92a of the reflector 92. In addition, the extension member 94 is formed such that its front surface 94b may be glossy as in the case of the reflection surface of the reflector 92. For this reason, the extension member 94 can be visually perceived as being integrated into the reflector 92 without awkwardness when viewed from an outside of the headlamp 26 through the lens 93.

Figure 5:
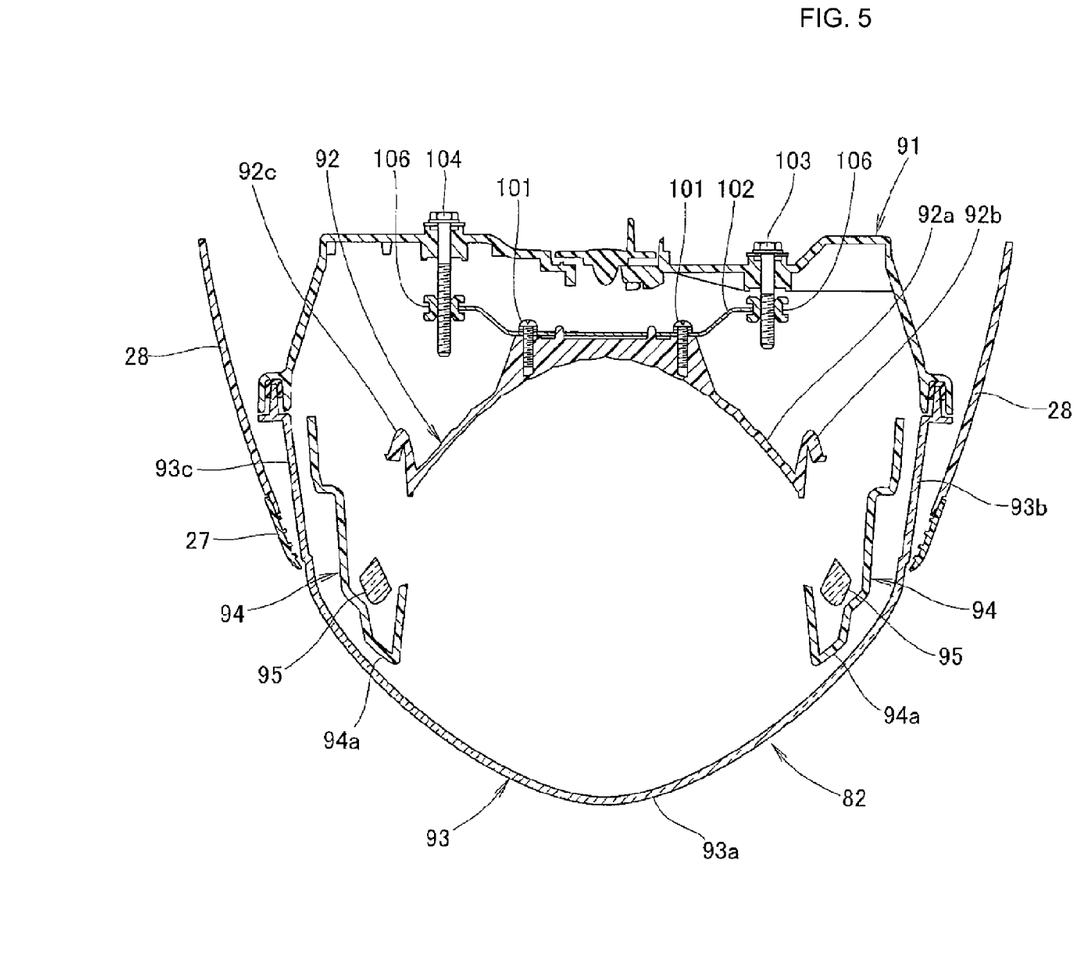
FIG. 5 is a cross-sectional view of the headlamp taken along the line 5-5 of FIG. 3.

As shown in FIG. 5, the extension member 94 has a bent portion 94a formed in its front end portion. The light guide member 95 is disposed behind the bent portion 94a.

The light guide member 95 may be transparent and colored, for example, blue. The light guide member 95 refracts and guides light from the low beam bulb 87 (see FIG. 4) toward the lens 93.

A support plate 102 is attached to a rear end portion of the reflector 92 with screws 101, 101. The support plate 102 may be attached to the housing 91 with adjusting bolts 103, 104 and intermediate members 106, and 106.

As the adjusting bolts 103 and 104 are turned, the attachment angle of the reflector 92 changes. This makes it possible to adjust the optical axes of the high beam lamp 81 (see FIG. 3) and the low beam lamp 82.

Figure 6:
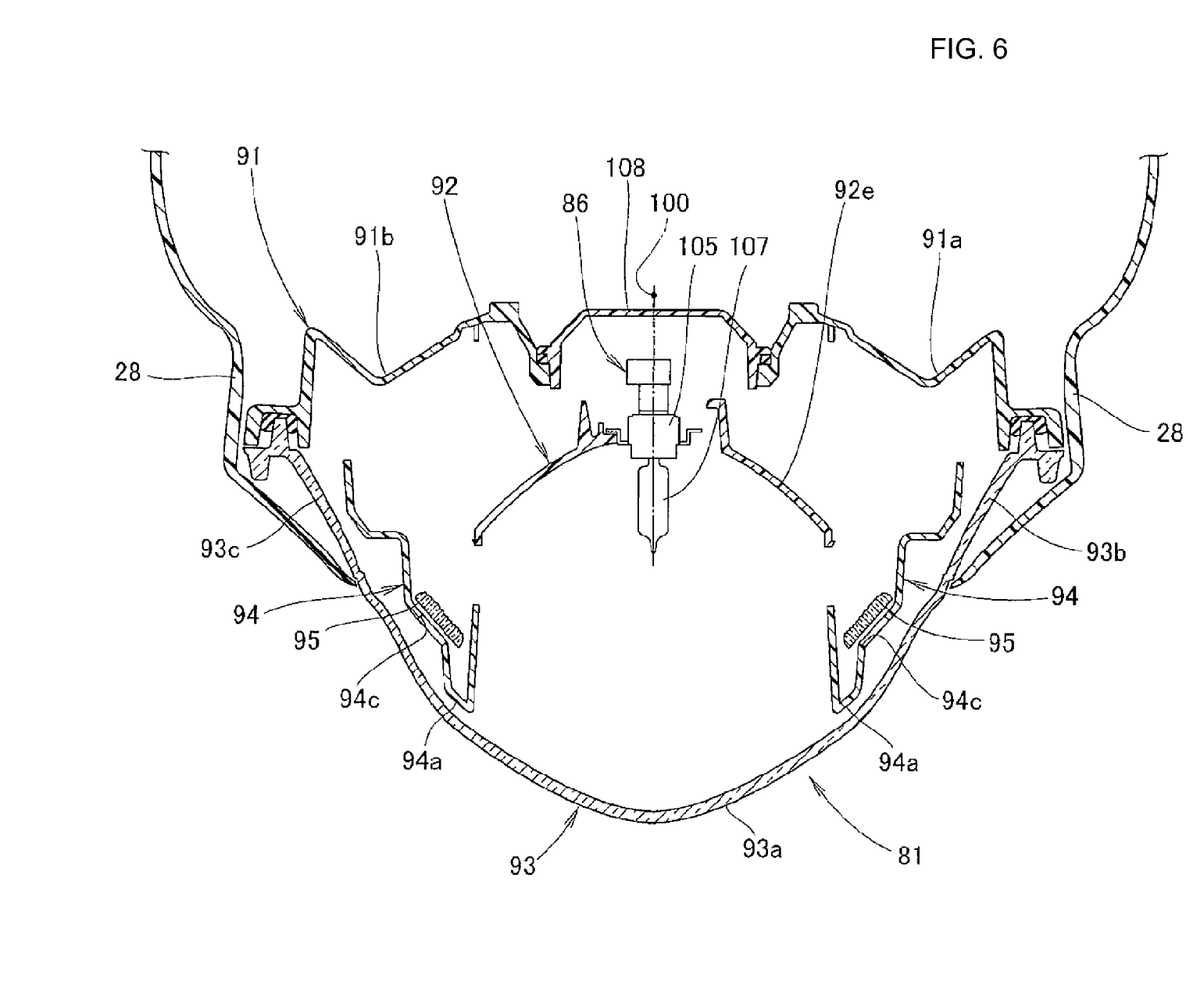
FIG. 6 is a cross-sectional view of the headlamp taken along the line 6-6 of FIG. 3.

As shown in FIG. 6, the high beam bulb 86 includes a base 105 attached to the reflector 92, a glass bulb 107 attached to the base 105, and a filament (unillustrated) disposed inside the glass bulb 107 and serving as a light source. Here, reference numeral 100 denotes a reference axis extending in the front-rear direction through the center of the high beam bulb 86.

Each extension member 94 is disposed outward, in the vehicle width direction, of a high beam reflecting portion 92e that reflects light from the high beam bulb 86. An opening portion 94c is formed in the extension member 94 in a region thereof close to the light guide member 95. Here, reference numeral 108 denotes a maintenance cap detachably attached to the housing 91 for maintenance of the high beam bulb 86.

The opening portion 94c is a region which direct light and reflected light from the low beam bulb 87 (see FIG. 4) pass through after being refracted by the light guide member 95. The light passing the opening portion 94c is visually recognized through the lens 93.

The housing 91 includes V-shaped concave portions 91a, 91b on left and right sides of its rear portion, for example, on left and right sides of the maintenance cap 108 so as to prevent interference with the front fork 14 (see FIG. 1) when the front fork 14 is steered.

Returning to FIG. 3, the lens 93 includes extended lens portions 78, 79 extending leftward and rightward, respectively, beyond the high beam reflecting portion 92e of the high beam lamp 81. The lens 93 is formed in an X-shape due to the extended lens portions 78 and 79.

Figure 7:
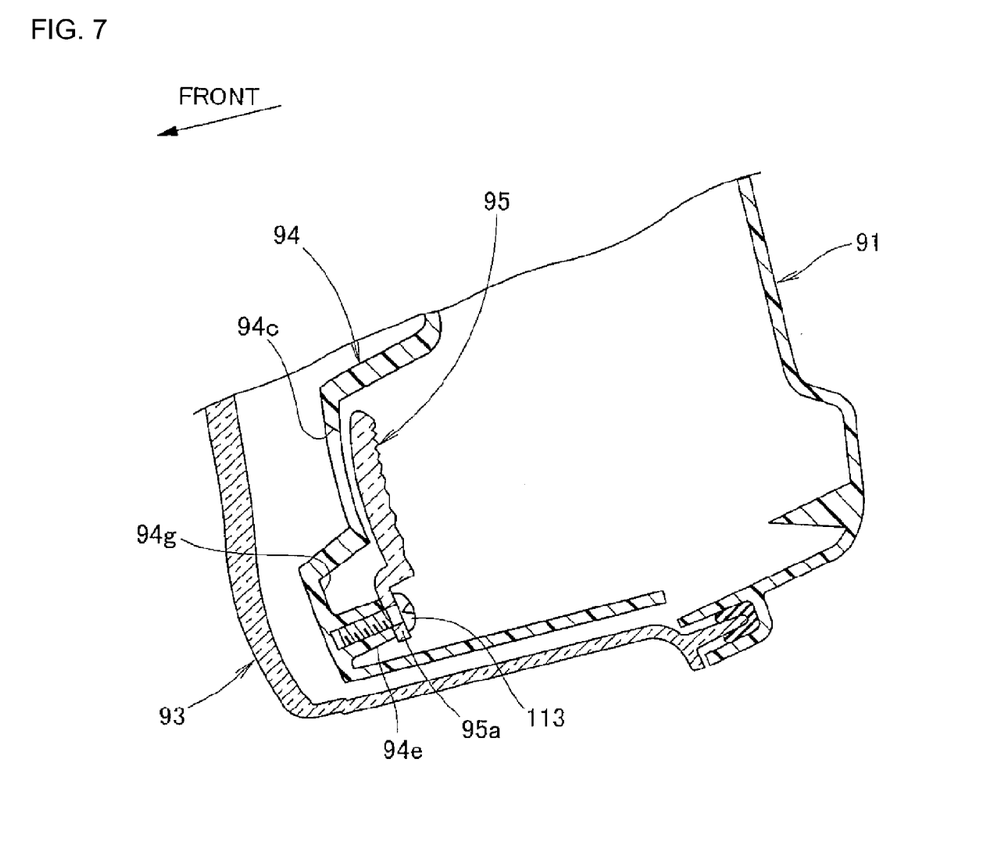
FIG. 7 is a cross-sectional view of the headlamp taken along the line 7-7 of FIG. 3.

As shown in FIG. 7, multiple boss portions 94e projecting rearward are integrally formed in a back surface 94g of a lower portion of the extension member 94. Multiple attachment portions 95a integrally formed in the light guide member 95 are attached to the boss portions 94e with screws 113, respectively.

The light guide member 95 has asperities formed in its inner surface to facilitate diffuse reflection. Due to light diffusion by the asperities, light passing through the opening portion 94c is widened.

Some effects of the headlamp 26 described above, including effects of the extension members 94 and the light guide members 95, will be described below.

Figure 8:
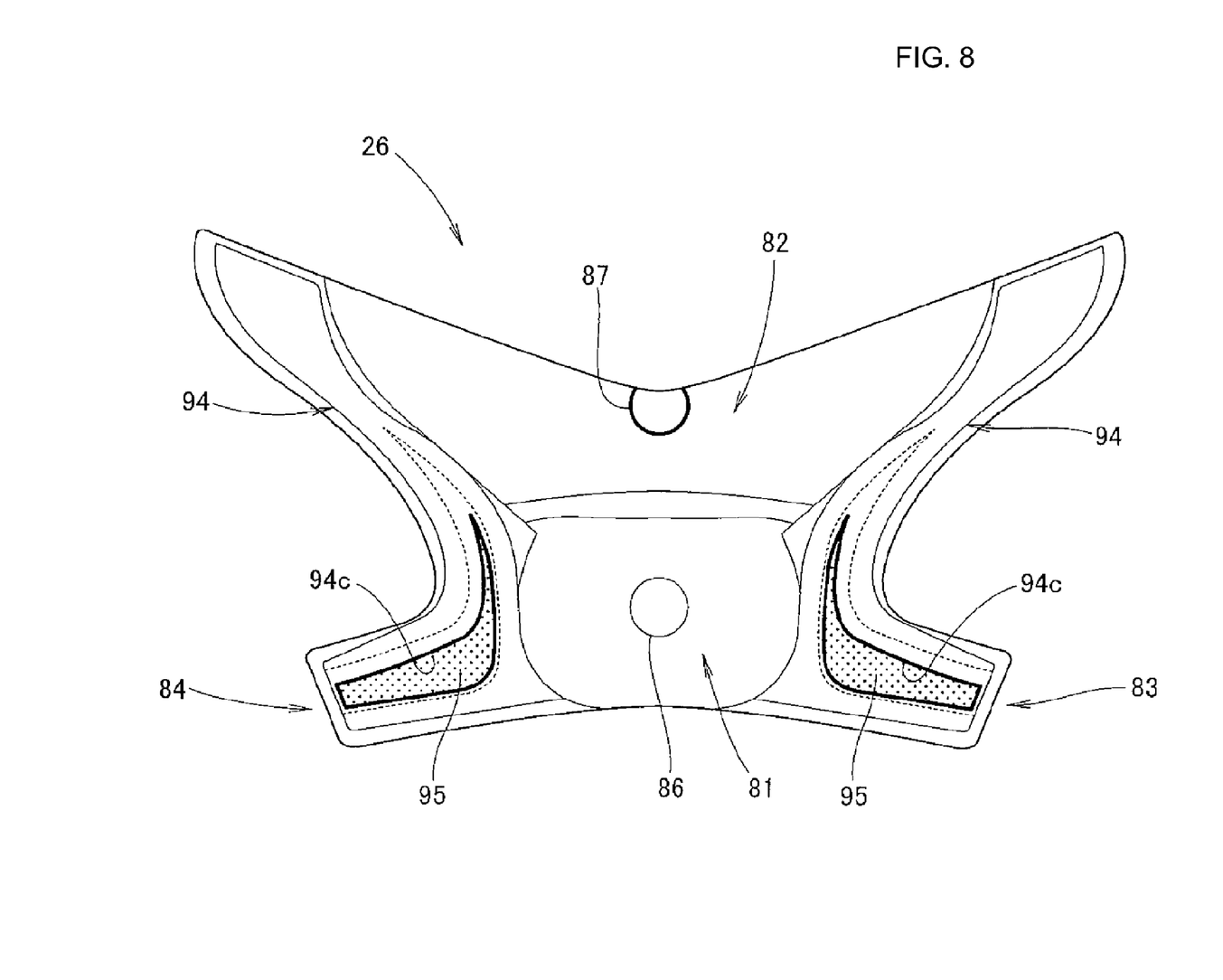
FIG. 8 is a first-effect view showing an effect of the headlamp according to an embodiment of the present invention.

As shown in FIG. 8, the light guide members 95 are disposed as a left and right pair in a truncated reverse V shape. The opening portion 94c, 94c of the extension members 94 are formed in a truncated reverse V shape along the edges of the respective light guide members 95, 95. Thus, when the low beam bulb 87 is turned on, light from the low beam bulb 87 passes through the light guide members 95 and is emitted to the outside from the opening portions 94c, 94c. Accordingly, the side light emitting parts 83, 84 provided on left and right sides of a lower portion of the headlamp 26 shine blue in the truncated reverse V shape.

This, as a result, causes both lateral sides of the high beam bulb 86, which is off, to shine, whereby the light is recognized as light beams from three sources. Accordingly, the visibility of the headlamp 26 can be improved.

In addition, the fact that the side light emitting parts 83, 84 shine in a different color, for example, blue, than the color the low beam bulb 87 shines, for example, white, makes the light emission of the headlamp 26 novel. Thereby, the marketability of the vehicle can be improved.

Figure 9:
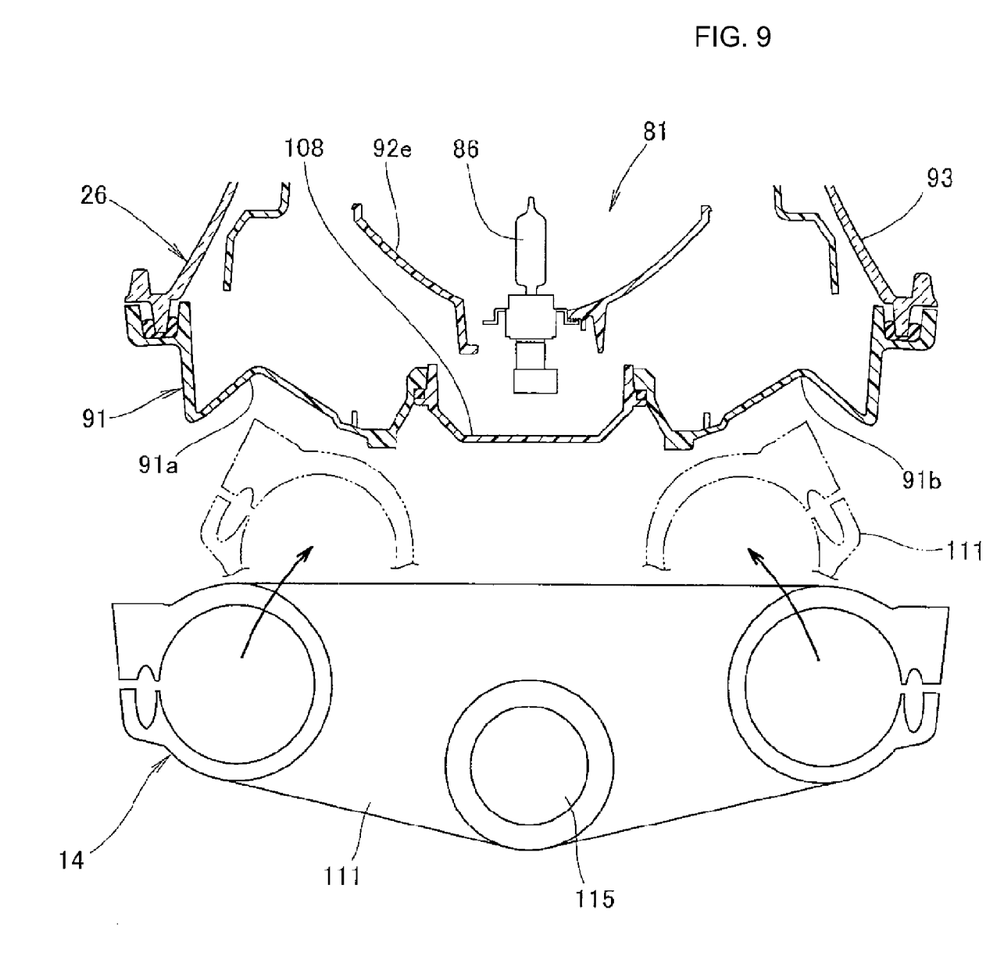
FIG. 9 is a second-effect view showing an effect of the headlamp according to an embodiment of the present invention.

As shown FIG. 9, a bottom bridge 111 of the front fork 14 reaches either of two-dot chain line positions in FIG. 9 when the front fork 14 is steered by turning the bar handle 22 (see FIG. 1) as far as possible to the right or left as indicated by a corresponding one of the arrows.

Even in this case, the left and right convex portions 91a, 91b formed in the housing 91 of the headlamp 26 prevent the bottom bridge 111 from interfering with the housing 91. Here, reference numeral 115 denotes a steering stem which is attached to the bottom bridge 111 and supported by the vehicle body frame 11 (see FIG. 1), and about which the front fork 14 turns.

The above structure enables the headlamp 26 to be disposed at a farther rear position while preventing interference with the front fork 14, and also makes it possible to reduce the length the headlamp 26 projects frontward. As a result, a motorcycle with a compact front part can be achieved.

As shown in FIGS. 3 and 6, the headlamp 26 for a motorcycle 10 includes the housing 91, the reflector 92 disposed inside the housing 91, which is divided into top and bottom reflectors disposed in an approximately center portion, in the vehicle width direction, of the vehicle body. The headlamp 26 may also include the low beam bulb 87 as a first bulb and the high beam bulb 86 as a second bulb attached to the top and bottom reflectors into which the reflector 92 is divided. The low beam bulb 87 is attached to the low beam reflecting portion 92a as the top reflector, and the high beam bulb 86 is attached to the high beam reflecting portion 92e as the bottom reflector. The lens 93 is disposed in front of the reflector 92. The lens 93 includes the extended lens portions 78, 79 extending leftward and rightward beyond the high beam reflecting portion 92e, respectively, and is formed in an X shape when viewed from the front due to the extended lens portions 78, 79. The paired left and right light guide members 95, 95 are disposed below the reference axis 96 of the low beam bulb 87 on the lateral sides of the high beam bulb 86, respectively. The extension members 94, 94 are disposed along side edges of the lens 93 in such a manner as to cover the front sides of the light guide members, respectively. The opening portions 94c, 94c are formed in the extension members 94, 94 so as to guide light from the light guide members 95, 95 to the extended lens portions 78, 79, respectively. Light from the low beam bulb 87 is emitted to an outside through the light guide members 95, the opening portions 94c, and the extended lens portions 78, 79.

Accordingly, the light guide members 95 are disposed at positions at which light, irrespective of direct light or reflected light, from the low beam bulb 87 are led to. Thus, the light guide members 95 emit light when the low beam bulb 87 is turned on. This makes it possible to provide a strong impression of the appearance of the X-shape of the headlamp 26 without having to use a separate light source. Further, it is possible to improve the design freedom of the headlamp 26, and also to improve the visibility of the headlamp 26 as well as the appearance of the headlamp 26 while it is turned on.

As shown in FIG. 3, the first bulb is the low beam bulb 87, and the second bulb is the high beam bulb 86. Upon turning on the first bulb as the low beam bulb 87 whose light expands more laterally, the light guide members 95 enable a lower portion of the headlamp 26 to emit light from laterally wider areas than otherwise. Thereby, the visibility of the headlamp 26 can be further improved.

As shown in FIGS. 4 and 6, the light guide members 95 and the extension members 94 are disposed at such positions as not to block light reflected in the vehicle front direction by the low beam reflecting portion 92a, as the first reflecting portion, and the high beam reflecting portion 92e, as the second reflecting portion. The low beam reflecting portion 92a and the high beam reflecting portion 92e are formed in the reflector 92, and are respectively dedicated for the low beam bulb 87 and the high beam bulb 86. Thus, the light guide members 95 and the extension members 94 do not adversely affect the light reflected by the reflector 92 of the low beam bulb 87 and the high beam bulb 86. Accordingly, the amount of light from the headlamp 26 can be secured.

As shown in FIG. 7, the light guide members 95 are screwed to the back portions of the extension members 94. Thus, the light guide members 95 can be attached to the extension members 94 in a relatively simple manner.

As shown in FIG. 3, the light guide members 95 are disposed as a left and right pair in a truncated reverse V shape in front view. Thus, light of the low beam bulb 87 can be guided frontward from the light guide members 95 in such a manner that light on a lower side of the headlamp 26 expands more laterally than that on an upper side thereof.

In addition, the opening portions 94c are formed as a left and right pair in a truncated reverse V shape in front view. Thus, both lateral side portions of a lower portion of the headlamp 26 can shine in the truncated reverse V shape, improving the visibility of the headlamp 26.

Moreover, the light guide members 95 are colored. Thus, the light guide members 95 emit light of a different color than those of direct light and reflected light from the low beam bulb 87. Thus, the light emission of the headlamp 26 can be made novel, further improving the marketability of the headlamp 26.

As shown in FIG. 9, the front fork 14 steerably provided to support the front wheel 23 is disposed behind the housing 91. The convex portions 91a and 91b to prevent interference with the front fork 14 are formed in the back portions of the housing 91. Thus, the headlamp 26 can be located close to the front fork 14, reducing the length the headlamp 26 projects frontward. This enables the appearance of the motorcycle 10 (see FIG. 1) to look compact.

It should be noted that, although the term bulb is used throughout this specification, this term is meant to include any appropriate light or lamp source, such as incandescent bulbs, halogen lamps, xenon lamps, and any other appropriate illumination technology.

Note that in embodiments of the present invention, the light guide members are screwed to the extension members. However, the present invention is not limited to this. The light guide members may be fixed to the extension members by bonding.

According to one embodiment of the invention, the lens includes the extended lens portions extending leftward and rightward beyond the bottom reflector, respectively, and is formed in an X shape in front view due to the extended lens portions. The paired left and right light guide members are disposed below the reference axis of the first bulb on the lateral sides of the second bulb, respectively. The extension members are disposed along the extended lens portions in such a manner as to cover the front sides of the light guide members, respectively. The opening portions are formed in the extension members so as to guide light from the light guide members to the extended lens portions, respectively. Light from the first bulb is emitted to an outside through the light guide members, the opening portions, and the extended lens portions. Accordingly, the light guide members can be disposed at positions which light, irrespective of direct light or reflected light, from the first bulb are led to, and can thus emit light when the first bulb is turned on. This makes it possible to provide a strong impression of the appearance of the X-shape of the headlamp without having to use a separate light source. Further, it is possible to improve the design freedom of the headlamp, and also to improve the visibility of the headlamp as well as the appearance of the headlamp while it is turned on.

According to another aspect of the invention, the first bulb is a low beam bulb, and the second bulb is a high beam bulb. Upon turning on the first bulb as the low beam bulb whose light expands more laterally, the light guide members enable a lower portion of the headlamp to emit light from laterally-wider areas than otherwise. Thereby, the visibility of the headlamp can be further improved.

According to another embodiment, the light guide members and the extension members are disposed at such positions as not to block reflected light reflected in the vehicle front direction by the first reflecting portion and the second reflecting portion which are formed in the reflector, and which are respectively dedicated for the first bulb and the second bulb. Thus, the light guide members and the extension members do not adversely affect the light reflected by the reflectors of the first and second bulbs. Accordingly, the amount of light from the headlamp can be secured.

According to an embodiment, the light guide members are disposed as a left and right pair in a truncated reverse V shape in front view. Thus, light of the first bulb can be guided frontward from the light guide members in such a manner that light on a lower side of the headlamp 26 expands more laterally than that on an upper side thereof.

According to another embodiment, the opening portions are formed as a left and right pair in a truncated reverse V shape in front view. Thus, both lateral side portions of a lower portion of the headlamp can shine in the truncated reverse V shape, improving the visibility of the headlamp.

According to yet another embodiment, the light guide members are colored. Thus, the light guide members emit light of a different color than those of direct light and reflected light from the first bulb. Thus, the light emission of the headlamp can be made novel, further improving marketability of the vehicle.

According to another embodiment, the front fork steerably provided to support the front wheel is disposed behind the housing, and the convex portions to prevent interference with the front fork are formed in the back portion of the housing. Thus, the headlamp can be located close to the front fork, reducing the length the headlamp projects frontward. This allows the appearance of the motorcycle 10 (see FIG. 1) to look compact.

Description of Reference Numerals
10 MOTORCYCLE
14 FRONT FORK
23 FRONT WHEEL
26 HEADLAMP
75 VEHICLE BODY CENTER LINE
78, 79 EXTENDED LENS PORTION
86 BULB, SECOND BULB (HIGH BEAM BULB)
87 BULB, FIRST BULB (LOW BEAM BULB)
91 HOUSING
92 REFLECTOR
92a FIRST REFLECTING PORTION (LOW BEAM REFLECTING PORTION)
92e SECOND REFLECTING PORTION (HIGH BEAM REFLECTING PORTION)
93 LENS
94 EXTENSION MEMBER
94c OPENING PORTION
95 LIGHT GUIDE MEMBER
96 REFERENCE AXIS

We claim:

1. A motorcycle headlamp, comprising:
a housing;
a reflector disposed inside the housing, wherein the reflector is divided into top and bottom reflectors disposed in an approximately center portion, in a vehicle width direction, of a vehicle body;
a first bulb and a second bulb attached to the top and bottom reflectors into which the reflector is divided, wherein the first bulb is attached to the top reflector, and the second bulb is attached to the bottom reflector; and
a lens disposed in front of the reflector,
wherein the lens includes extended lens portions extending leftward and rightward beyond the bottom reflector, respectively, the lens portions forming an X shape;
wherein paired left and right light guide members are disposed below a reference axis of the first bulb on lateral sides of the second bulb, respectively;
wherein extension members are disposed along the extended lens portions in such a manner as to cover front sides of the light guide members, respectively;
wherein opening portions are formed in the extension members so as to guide light from the light guide members to the extended lens portions, respectively; and
wherein light from the first bulb is externally emitted through the light guide members, the opening portions, and the extended lens portions.

2. The motorcycle headlamp according to claim 1, wherein:
the first bulb is a low beam bulb; and
the second bulb is a high beam bulb.

3. The motorcycle headlamp according to claim 1, wherein the light guide members and the extension members are disposed at such positions as not to block reflected light reflected in a vehicle front direction by a first reflecting portion and a second reflecting portion which are formed in the reflector, and wherein the first reflecting portion and the second reflecting portion are respectively dedicated for the first bulb and the second bulb.

4. The motorcycle headlamp according to claim 1, wherein the light guide members are screwed to back portions of the extension members, respectively.

5. The motorcycle headlamp according to claim 1, wherein the light guide members are disposed as a left and right pair in a truncated reverse V shape.

6. The motorcycle headlamp according to claim 1, wherein the opening portions are formed as a left and right pair in a truncated reverse V shape.

7. The motorcycle headlamp according to claim 1, wherein the light guide members are colored.

8. The motorcycle headlamp according to claim 1, wherein:
a front fork is steerably provided to support a front wheel is disposed behind the housing, and
convex portions to prevent interference with the front fork are formed in a back portion of the housing.

9. A method, comprising:
providing a housing;
providing a reflector disposed inside the housing,
dividing the reflector into top and bottom reflectors disposed in an approximately center portion, in a vehicle width direction, of a vehicle body;
attaching a first bulb and a second bulb to the top and bottom reflectors into which the reflector is divided, wherein the first bulb is attached to the top reflector, and the second bulb is attached to the bottom reflector;
disposing a lens in front of the reflector, wherein the lens includes extended lens portions extending leftward and rightward beyond the bottom reflector, respectively, the lens portions forming an X shape;
disposing paired left and right light guide members below a reference axis of the first bulb on lateral sides of the second bulb, respectively;
disposing extension members along the extended lens portions in such a manner as to cover front sides of the light guide members, respectively; and
forming opening portions in the extension members so as to guide light from the light guide members to the extended lens portions, respectively,
wherein light from the first bulb is externally emitted through the light guide members, the opening portions, and the extended lens portions.

10. The method according to claim 9, wherein:
the first bulb comprises a low beam bulb; and
the second bulb comprises a high beam bulb.

11. The method according to claim 9, further comprising disposing the light guide members and the extension members at such positions as not to block reflected light reflected in a vehicle front direction by a first reflecting portion and a second reflecting portion which are formed in the reflector, and wherein the first reflecting portion and the second reflecting portion are respectively dedicated for the first bulb and the second bulb.

12. The method according to claim 9, further comprising attaching the light guide members to back portions of the extension members, respectively.

13. The method according to claim 9, further comprising disposing the light guide members as a left and right pair in a truncated reverse V shape.

14. The method according to claim 9, further comprising forming the opening portions as a left and right pair in a truncated reverse V shape.

15. The method according to claim 9, wherein the disposing the light guide members comprises disposing colored light guide members.

16. The method according to claim 9, further comprising:
    disposing a front fork that is steerably provided to support a front wheel behind the housing: and
    forming convex portions to prevent interference with the front fork in a back portion of the housing.

17. A motorcycle headlamp, comprising:
    housing means for containing a headlamp;
    reflecting means, disposed inside the housing, for reflecting light, wherein the reflecting means is divided into top and bottom reflecting means disposed in an approximately center portion, in a vehicle width direction, of a vehicle body;
    first bulb means and second bulb means, attached to the top and bottom reflectors into which the reflector is divided, for providing illumination, wherein the first bulb means is attached to the top reflecting means, and the second bulb means is attached to the bottom reflecting means; and
    lens means, disposed in front of the reflecting means, for focusing light, wherein the lens means includes extended lens portions extending leftward and rightward beyond the bottom reflector, respectively, the lens portions forming an X shape;
    paired left and right light guide means for guiding light, the left and right light guide means disposed below a reference axis of the first bulb means on lateral sides of the second bulb means, respectively;
    extension means, disposed along the extended lens portions, for covering front sides of the light guide means, respectively; and
    opening means, formed in the extension means, for guiding light from the light guide means to the extended lens portions, respectively,
    wherein light from the first bulb is externally emitted through the light guide members, the opening portions, and the extended lens portions.

* * * * *